UNITED STATES PATENT OFFICE.

CARL F. L. LIMPACH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF COLORING-MATTER.

SPECIFICATION forming part of Letters Patent No. 268,505, dated December 5, 1882.

Application filed June 22, 1882. (No specimens.) Patented in France May 27, 1882, No. 137,109, and in England May 30, 1882, No. 2,544.

*To all whom it may concern:*

Be it known that I, CARL FRIEDRICH LEONHARD LIMPACH, Doctor of Philosophy, of Höchst-on-the-Main, Germany, have invented certain new and useful Improvements in Coloring-Matters; and I do hereby declare that the following is a full, clear, and exact description of the invention, which will enable others skilled in the art to which it appertains to make and use the same.

My invention relates to the production of a new coloring-matter.

It consists in producing a bluish-red coloring-matter by the action of beta-naphthol trisulphonic acid with sodium salt upon the diazo compound of the sulphonic acid of amido-azo-benzole.

In order to produce trisulphonic acid of beta-naphthol—a product discovered by me—I mix one part of naphthol with four to five parts of fuming sulphuric acid (containing twenty per cent. $SO_3$) in such a manner that the temperature of the mixture will rise to 284°–320° Fahrenheit, (140°–160° centigrade.) I allow the action to proceed at said temperature until a sample of the product gives, with ammonia, a solution showing a pure green fluorescence, and which, after standing, produces a coloring-matter with diazoxylol in an alkaline solution. This point having been reached, the mass is converted into sodium salt of the trisulphonic acid of beta-naphthol in the usual manner.

To produce the coloring-matter I mix thoroughly 27.7 parts of the sulphonic acid of amidoazo-benzole, twenty-five parts muriatic acid, (containing thirty-three per cent. HCe,) and two hundred and fifty parts water, to which I add 6.9 parts of nitrite of sodium dissolved in twenty parts of water, taking care the while to keep the temperature below 41° Fahrenheit, (5° centigrade.) When, after a sufficient length of time, the diazo compound has formed, its solution is introduced into a solution of fifty parts of the sodium salt of the beta-naphthol trisulphonic acid in two hundred and fifty parts of water, to which ten parts of aqueous ammonia (containing twenty-four per cent. $NH_3$) are added. The greater part of the coloring-matter separates in the form of a voluminous precipitate, which is purified by dissolving it in water and precipitating it by means of common salt.

By dissolving the said coloring-matter in concentrated sulphuric acid a solution of bluish-violet shade is obtained.

When boiled with tin and muriatic acid the coloring-matter is destroyed.

Having thus described my invention, what I claim as new, and desire to secure by Letters Patent, is—

As a new manufacture, the bluish-red coloring-matter produced by the action of the sulphonic acid of amidoazo-benzole upon an alkaline solution of the trisulphonic acid of beta-naphthol, or by any other means that will produce a like result.

In testimony that I claim the foregoing as my own I affix my signature in presence of two witnesses.

CARL FRIEDRICH LEONHARD LIMPACH.

Witnesses:
F. VOGELER,
A. S. HOGUE.